United States Patent
Viscotchi et al.

(10) Patent No.: US 11,801,943 B2
(45) Date of Patent: Oct. 31, 2023

(54) SYSTEM AND METHOD FOR DETECTING A FUEL LEAK IN AN AIRCRAFT

(71) Applicant: BOMBARDIER INC., Dorval (CA)

(72) Inventors: George Viscotchi, Dollard-des-Ormeaux (CA); Alexandre Laporte, Vaudreuil-Dorion (CA)

(73) Assignee: BOMBARDIER INC., Montreal (CA)

( * ) Notice: Subject to any disclaimer, the term of this patent is extended or adjusted under 35 U.S.C. 154(b) by 706 days.

(21) Appl. No.: 16/854,571

(22) Filed: Apr. 21, 2020

(65) Prior Publication Data

US 2020/0262578 A1 Aug. 20, 2020

Related U.S. Application Data

(63) Continuation of application No. PCT/CA2018/051318, filed on Oct. 19, 2018.

(60) Provisional application No. 62/575,590, filed on Oct. 23, 2017.

(51) Int. Cl.
*B64D 37/00* (2006.01)
*B64D 37/32* (2006.01)
*G01M 3/02* (2006.01)
*G01M 3/26* (2006.01)
*G05B 23/02* (2006.01)
(Continued)

(52) U.S. Cl.
CPC .............. *B64D 37/32* (2013.01); *B64D 37/00* (2013.01); *G01M 3/025* (2013.01); *G01M 3/26* (2013.01); *G05B 23/0205* (2013.01); *B64D 2045/0085* (2013.01); *B64F 5/60* (2017.01)

(58) Field of Classification Search
CPC .............................. B64D 37/04; G01M 3/025
See application file for complete search history.

(56) References Cited

U.S. PATENT DOCUMENTS

| | | |
|---|---|---|
| 4,218,744 A | 8/1980 | King et al. |
| 7,603,242 B2 | 10/2009 | Tichborne et al. |
| 7,739,004 B2 | 6/2010 | Johnson |

(Continued)

FOREIGN PATENT DOCUMENTS

| | | |
|---|---|---|
| CN | 103822763 A | 5/2014 |
| EP | 2330275 B1 | 2/2017 |

(Continued)

OTHER PUBLICATIONS

International Search Report and Written Opinion with regard to PCT/CA2018/051318 dated Jan. 8, 2019.

(Continued)

*Primary Examiner* — Hyun D Park
(74) *Attorney, Agent, or Firm* — BCF LLP

(57) ABSTRACT

A method of and a system for detecting a fuel leak in an aircraft, the aircraft comprising a first engine and a second engine. The method comprises upon determining that the aircraft has reached a first mode of operation: acquiring a first baseline fuel flow of the first engine; acquiring a second baseline fuel flow of the second engine. The method further comprises monitoring a first current fuel flow measured at the first engine and a second current fuel flow measured at the second engine; and triggering a fuel leak detection based on an analysis of the first baseline fuel flow, the first current fuel flow, the second baseline fuel flow and the second current fuel flow.

18 Claims, 11 Drawing Sheets

(51) Int. Cl.
*B64F 5/60* (2017.01)
*B64D 45/00* (2006.01)

(56) References Cited

U.S. PATENT DOCUMENTS

| | | |
|---|---|---|
| 8,387,440 B2 | 3/2013 | Rivot |
| 9,140,189 B2 | 9/2015 | Romig et al. |
| 2008/0125930 A1* | 5/2008 | Johnson .................. F02C 9/46 |
| | | 701/9 |
| 2009/0241642 A1* | 10/2009 | Kyllingstad .......... G01M 3/025 |
| | | 73/40 |
| 2010/0288883 A1* | 11/2010 | Rivot ..................... B64D 37/32 |
| | | 340/963 |
| 2015/0013451 A1 | 1/2015 | Van Der Linde et al. |
| 2016/0178471 A1 | 6/2016 | Blumrich |

FOREIGN PATENT DOCUMENTS

| | | |
|---|---|---|
| JP | H08277750 A | 10/1996 |
| JP | 2002310024 A | 10/2002 |
| WO | 2006032873 A1 | 3/2006 |
| WO | 2014030555 A1 | 2/2014 |

OTHER PUBLICATIONS

English Abstract for CN103822763 retrieved on Espacenet on Jan. 17, 2019.
English Abstract for JP2002310024 retrieved on Espacenet on Apr. 20, 2020.
English Abstract for EP2330275 retrieved on Espacenet on Apr. 20, 2020.
English Abstract for JPH08277750 retrieved on Espacenet on Apr. 20, 2020.

* cited by examiner

1000

DETERMINE THAT THE AIRCRAFT HAS REACHED A FIRST MODE OF OPERATION
1002

ACQUIRE A FIRST BASELINE FUEL FLOW OF THE FIRST ENGINE, THE FIRST BASELINE FUEL FLOW BEING DETERMINED AS AN AVERAGE ACTUAL FUEL FLOW OF THE FIRST ENGINE ESTABLISHED OVER A PERIOD OF TIME WHILE OPERATING IN ACCORDANCE WITH THE FIRST MODE OF OPERATION
1004

ACQUIRE A SECOND BASELINE FUEL FLOW OF THE SECOND ENGINE, THE SECOND BASELINE FUEL FLOW BEING DETERMINED AS AN AVERAGE ACTUAL FUEL FLOW OF THE SECOND ENGINE ESTABLISHED OVER A PERIOD OF TIME WHILE OPERATING IN ACCORDANCE WITH THE FIRST MODE OF OPERATION
1006

MONITOR A FIRST CURRENT FUEL FLOW MEASURED AT THE FIRST ENGINE AND A SECOND CURRENT FUEL FLOW MEASURED AT THE SECOND ENGINE
1008

TRIGGER A FUEL LEAK DETECTION BASED ON AN ANALYSIS OF THE FIRST BASELINE FUEL FLOW, THE FIRST CURRENT FUEL FLOW, THE SECOND BASELINE FUEL FLOW AND THE SECOND CURRENT FUEL FLOW
1010

SYSTEM AND METHOD FOR DETECTING A FUEL LEAK IN AN AIRCRAFT

CROSS-REFERENCE TO RELATED APPLICATIONS

The present application is a continuation of International Application No. PCT/CA2018/051318, filed Oct. 19, 2018, which claims the benefit of U.S. Provisional Patent Application No. 62/575,590, filed Oct. 23, 2017. Each of the applications and patents listed in this paragraph are incorporated herein by reference.

FIELD

The present technology relates to systems and methods for detecting fuel leaks in an aircraft. In particular, the systems and methods allow analysing baseline fuel flows and current fuel flows to trigger a fuel leak detection.

BACKGROUND

Presence of an undetected fuel leak of an aircraft may cause security risks, in particular when the aircraft is distant from any diversion airport. In order to mitigate the risks of undetected fuel leak(s), most aircraft are equipped with an automatic fuel leak detection system. Typically, such automatic fuel leak detection systems comprise fuel probes located in one or more of the fuel tanks of the aircraft, the fuel probes allow measurement of a quantity of fuel in the one or more fuel tanks. The automatic fuel leak detection systems also comprise, for each one of the engines, a flowmeter allowing a reading of a fuel flow rate entering the engine and, from this information, deduce the quantity of fuel consumed by each engine. In some approaches, a comparison of a first value of consumption computed from the variation in the quantity of fuel on board since the beginning of the flight (read by the fuel probes) with a second consumption value computed from the flowmeters from the beginning of the flight may enable detection of a fuel leak. Amongst other limitations, such approach may only be used to determine a leak in a fuel supply system upstream to the flowmeters (i.e., between the fuel tanks and the flowmeters of the engines) and may have a limited degree of accuracy in detecting a fuel leak.

Alternative approaches have therefore been developed, such as the method described in U.S. Pat. No. 7,739,004 to The Boeing Company. The method monitors and alerts a fuel leak downstream of an engine fuel flowmeter in an aircraft. The method uses existing engine sensor data to input into predetermined parameter model to predict the nominal fuel flow and also compares fuel flow between a left engine and a right engine. Even though such an approach may provide benefits, it may still present limitations, in particular due to the "one predetermined parameter model" fits for all engines which may need to require relatively "high" error margins.

Improvements may therefore still be desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

In one aspect, various implementations of the present technology provide a method of detecting a fuel leak in an aircraft, the aircraft comprising a first engine and a second engine, the method comprising:
upon determining that the aircraft has reached a first mode of operation:
    acquiring a first baseline fuel flow of the first engine, the first baseline fuel flow being determined as an average actual fuel flow of the first engine established over a period of time while operating in accordance with the first mode of operation;
    acquiring a second baseline fuel flow of the second engine, the second baseline fuel flow being determined as an average actual fuel flow of the second engine established over the period of time while operating in accordance with the first mode of operation;
monitoring a first current fuel flow measured at the first engine and a second current fuel flow measured at the second engine; and
triggering a fuel leak detection based on an analysis of the first baseline fuel flow, the first current fuel flow, the second baseline fuel flow and the second current fuel flow.

In another aspect, the analysis of the first baseline fuel flow, the first current fuel flow, the second baseline fuel flow and the second current fuel flow comprises:
    calculating a first ratio based on the first current fuel flow and the first baseline fuel flow; and
    calculating a second ratio based on the second current fuel flow and the second baseline fuel flow.

In yet another aspect, triggering the fuel leak detection comprises at least one of triggering a first fuel leak detection associated with the first engine and triggering a second fuel leak detection associated with the second engine.

In another aspect, the first fuel leak detection is triggered based on a determination that the following conditions are met:
    (a) the first ratio is above the second ratio;
    (b) an absolute value of a difference between the first ratio and the second ratio is above a first predetermined threshold; and
    (c) a position difference between a first position of a first throttle controlling the first engine and a second position of a second throttle controlling the second engine is below a second predetermined threshold.

In yet another aspect, the second fuel leak detection is triggered based on a determination that the following conditions are met:
    (a) the second ratio is above the first ratio;
    (b) an absolute value of a difference between the first ratio and the second ratio is above a first predetermined threshold; and
    (c) a position difference between a first position of a first throttle controlling the first engine and a second position of a second throttle controlling the second engine is below a second predetermined threshold.

In another aspect, the first predetermined threshold is 10% and the second predetermined threshold is 0.3 degree.

In yet another aspect, determining that the aircraft has reached the first mode of operation comprises determining that the following conditions are met:
    (a) the aircraft is in flight;
    (b) an altitude of the aircraft is between 20,000 feet and 51,000 feet;
    (c) a rate of change of the altitude is between −400 feet/min and +400 feet/min;

(d) an air speed of the aircraft is between Mach 0.6 and Mach 0.94;

(e) fan speeds of the first engine and of the second engine is between 60% and 120% fan speed; and (f) a total air temperature (TAT) sensed by the aircraft is between −60 Celsius degrees and +40 Celsius degrees.

In another aspect, the period of time is 60 seconds.

In yet another aspect, the method further comprises, prior to determining that the first mode of operation has been reached and up until determination that the first mode of operation has been reached:

accessing, from a non-transitory computer-readable medium, a first pre-existing baseline fuel flow and a second pre-existing baseline fuel flow, the first pre-existing baseline fuel flow and the second pre-existing baseline fuel flow having been acquired during a previous flight of the aircraft; and triggering the fuel leak detection based on an analysis of the first pre-existing baseline fuel flow, the first current fuel flow, the second pre-existing baseline fuel flow and the second current fuel flow.

In another aspect, triggering the fuel leak detection comprises at least one of triggering a first fuel leak detection associated with the first engine and triggering a second fuel leak detection associated with the second engine and wherein the analysis of the first pre-existing baseline fuel flow, the first current fuel flow, the second pre-existing baseline fuel flow and the second current fuel flow comprises:

calculating a third ratio based on the first current fuel flow and the first pre-existing baseline fuel flow; and calculating a fourth ratio based on the second current fuel flow and the second pre-existing baseline fuel flow.

In yet another aspect, the first fuel leak detection is triggered based on a determination that the following conditions are met:

(a) the third ratio is above the fourth ratio;

(b) an absolute value of a difference between the third ratio and the fourth ratio is above a first predetermined threshold; and (c) a position difference between a first position of a first throttle controlling the first engine and a second position of a second throttle controlling the second engine is below a second predetermined threshold.

In another aspect, the second fuel leak detection is triggered based on a determination that the following conditions are met:

(a) the fourth ratio is above the third ratio;

(b) an absolute value of a difference between the third ratio and the fourth ratio is above a first predetermined threshold; and (c) a position difference between a first position of a first throttle controlling the first engine and a second position of a second throttle controlling the second engine is below a second predetermined threshold.

In yet another aspect, the first predetermined threshold is 25% and the second predetermined threshold is 0.3 degree.

In other aspects, various implementations of the present technology provide a system for detecting a fuel leak in an aircraft, the aircraft comprising a first engine and a second engine, the system comprising:

a processor;

a non-transitory computer-readable medium, the non-transitory computer-readable medium comprising control logic which, upon execution by the processor, causes:

upon determining that the aircraft has reached a first mode of operation:

acquiring a first baseline fuel flow of the first engine, the first baseline fuel flow being determined as an average actual fuel flow of the first engine established over a period of time while operating in accordance with the first mode of operation;

acquiring a second baseline fuel flow of the second engine, the second baseline fuel flow being determined as an average actual fuel flow of the second engine established over the period of time while operating in accordance with the first mode of operation;

monitoring a first current fuel flow measured at the first engine and a second current fuel flow measured at the second engine; and triggering a fuel leak detection based on an analysis of the first baseline fuel flow, the first current fuel flow, the second baseline fuel flow and the second current fuel flow.

In other aspects, various implementations of the present technology provide a non-transitory computer-readable medium storing program instructions for detecting a fuel leak in an aircraft, the program instructions being executable by a processor of a computer-based system to carry out one or more of the above-recited methods.

In the context of the present specification, unless expressly provided otherwise, a computer system may refer, but is not limited to, an "electronic device", a "controller", a "fuel controller", a "control computer", a "control system", a "computer-based system", a "fuel management system", a "fuel leak determination system", a "fuel monitoring system" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 10 is a diagram illustrating a flowchart illustrating a computer-implemented method implementing embodiments of the present technology.

Figure 1A:
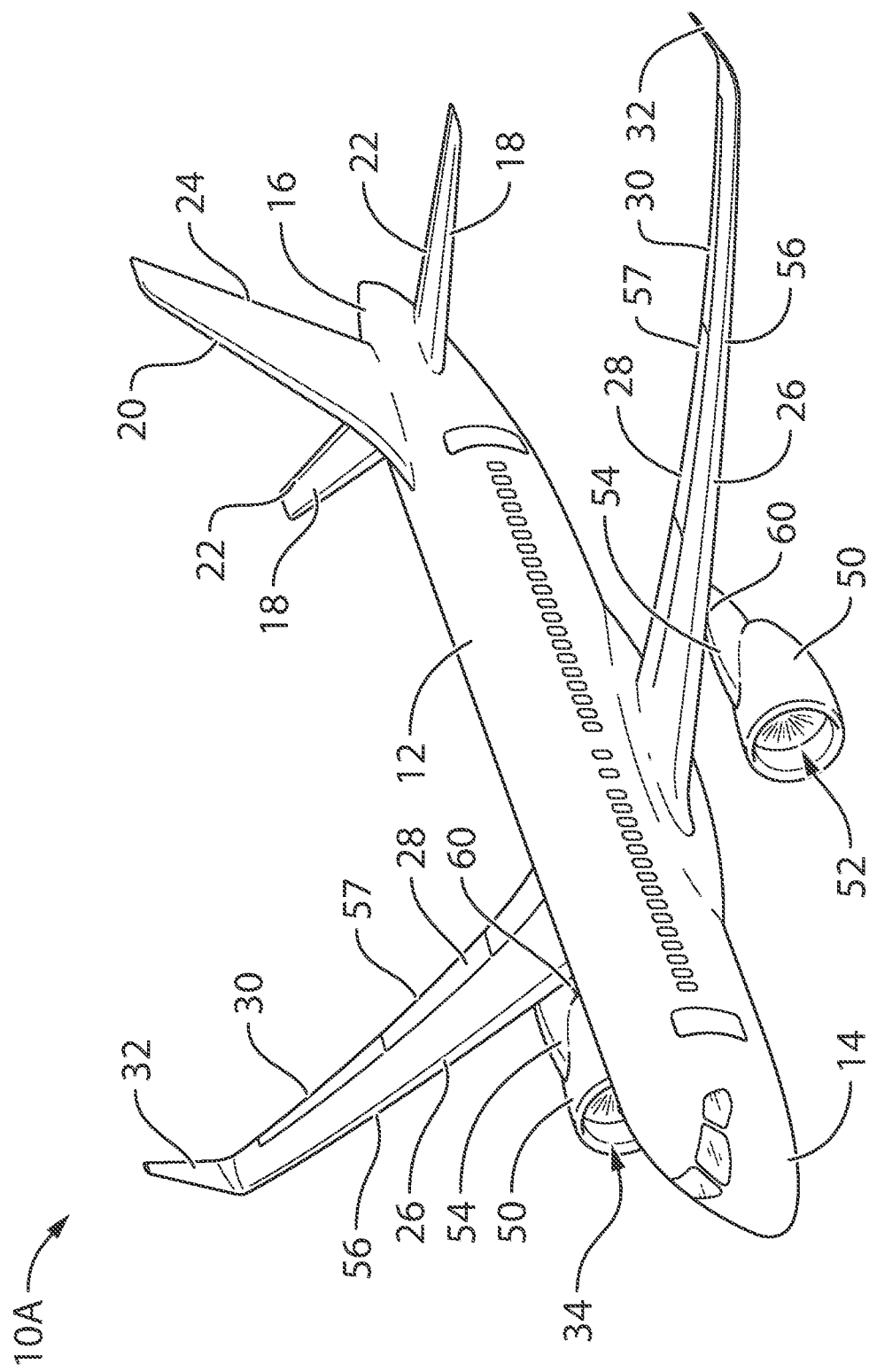
FIG. 1A is a perspective view taken from a top, front, left side of an embodiment of an aircraft.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "controller", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term "processor" or "controller" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply "module(s)" which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 1A, there is shown an aircraft 10A. The aircraft 10A is an exemplary implementation of an aircraft and other types of aircraft are contemplated, such as, but without being limitative, an aircraft 10B illustrated in FIG. 1B. The aircraft 10A has a fuselage 12, a cockpit 14 at a front of the fuselage 12 and a tail 16 at a rear of the fuselage 12. The tail 16 has left and right horizontal stabilizers 18 and a vertical stabilizer 20. Each horizontal stabilizer 18 is provided with an elevator 22 used to control the pitch of the aircraft 10A. The vertical stabilizer 20 is provided with a rudder 24 used to control the yaw of the aircraft 10A. The aircraft 10A also has a pair of wings 26. The left wing 26 is connected to the fuselage 12 and extends on a left side thereof. The right wing 26 is connected to the fuselage 12 and extends on a right side thereof. The wings 26 are provided with flaps 28 and ailerons 30. The flaps 28 are used to control the lift of the aircraft 10A and the ailerons 30 are used to control the roll of the aircraft 10A. Optionally, each wing 26 is provided with a winglet 32 at a tip thereof. Left and right engine assemblies 34 are connected to a bottom of the left and right wings 26 respectively, as will be described in greater detail below. It is contemplated that more than one engine assembly 34 could be connected to each wing 26. The aircraft 10A is provided with many more components and systems, such as a landing gear and auxiliary power unit, which will not be described herein.

Figure 1B:
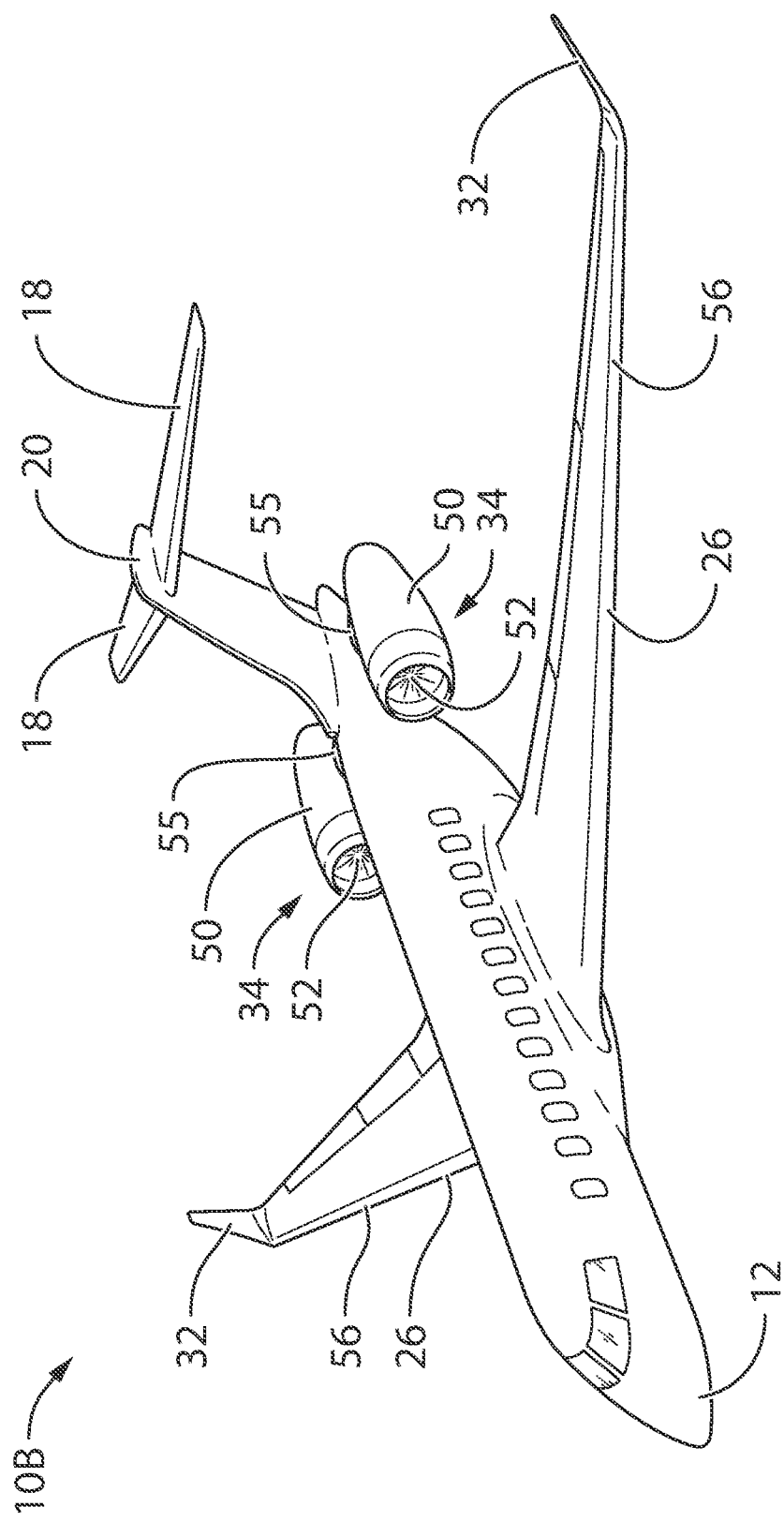
FIG. 1B is a front view of another embodiment of an aircraft.

Turning now to FIG. 1B, the aircraft 10B illustrates another embodiment of aircraft. Components of the aircraft 10B similar to components of the aircraft 10A are referred to with same reference numbers. As can be seen from FIG. 1B, left and right engine assemblies 34 are connected to rearward left and right portions of the fuselage 12 and not to a bottom of the left and right wings 26 as it is the case for the aircraft 10A. The tail of the aircraft 10B also has left and right horizontal stabilizers 18 and a vertical stabilizer 20. Contrary to the configuration of the aircraft 10A, the left and right horizontal stabilizers 18 of the aircraft 10B are connected to a top portion of the vertical stabilizer 20 so at to form a "T-shaped configuration".

Figure 2:
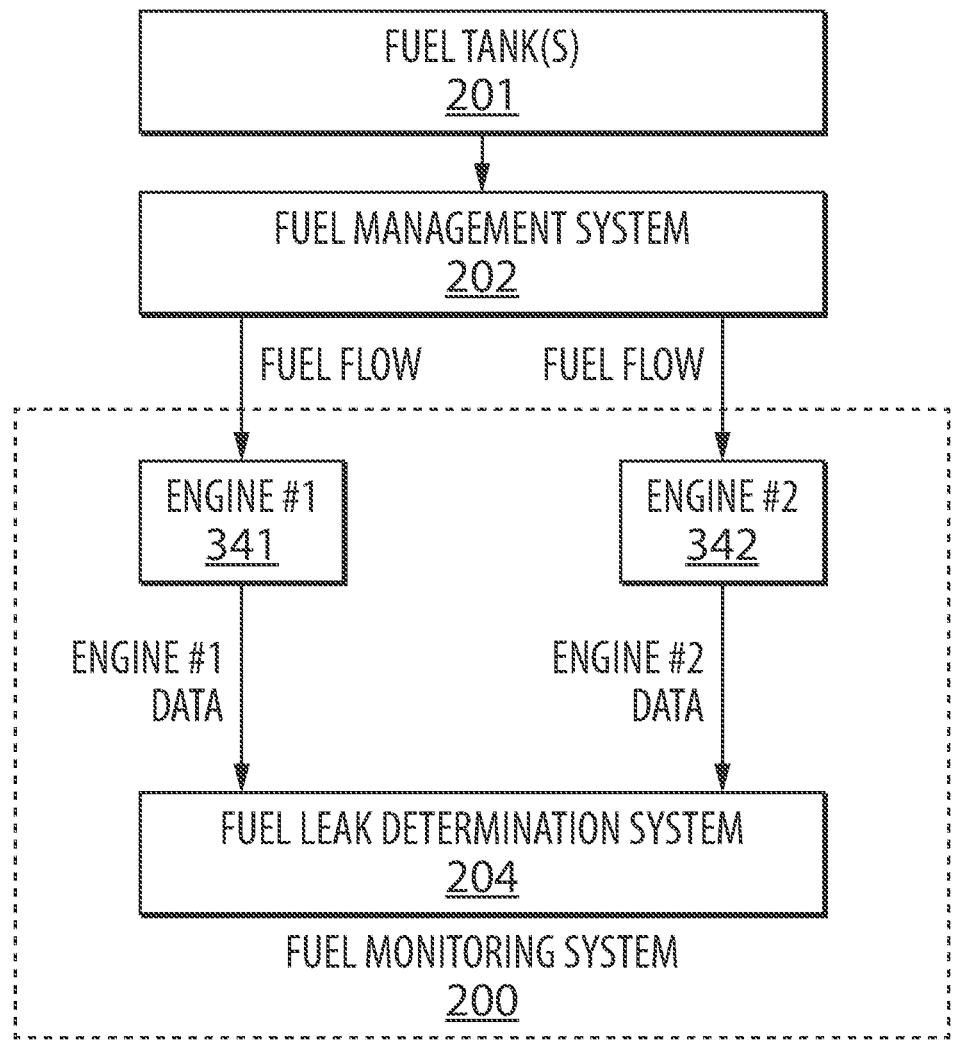
FIG. 2 is a diagram of a fuel monitoring system in accordance with an embodiment of the present technology.

Referring now concurrently to FIGS. 1A, 1B and 2, the left engine assembly 34, a fuel management system 202, one or more fuel tanks 201 and a fuel monitoring system 200 will be described in more detail. As the right engine assembly 34 is similar to the left engine assembly 34, it will not be described in detail herein. Elements of the right engine assembly 34 that correspond to those of the left engine assembly 34 have been labeled with the same reference in the figures.

In both the aircraft 10A and the aircraft 10B, the left engine assembly 34 has a nacelle 50 inside which is an engine 52. In the present implementation of the aircraft 10A, the engine 52 is a turbofan engine such as the Pratt & Whitney™ PW1500G™ turbofan engine. In the present implementation of the aircraft 10B, the engine 52 is a turbofan engine from General Electric™. It is contemplated that other turbofan engines could be used. It is also contemplated that an engine other than a turbofan engine could be used.

In the aircraft embodiment illustrated by the aircraft 10A, a pylon 54 is connected between the nacelle 50 and a bottom of the left wing 26, thereby connecting the engine 52 to the left wing 26. The pylon 54 extends along a top of the nacelle 50. A majority of the pylon 54 extends forward of a leading edge 56 of the left wing 26. The top, rear portion of the pylon 54 connects to the bottom, front portion of the wing 26.

In the aircraft embodiment illustrated by the aircraft 10B, a pylon 55 is connected between the nacelle 50 and a left side of the fuselage 16, thereby connecting the engine 52 to the fuselage 16. The pylon 55 extends along a side of the nacelle 50 on one end and along a rearward side of the fuselage 16 on the other end.

As can be seen in FIG. 2, the engine assembly 34 is also fluidly connected to the fuel management system 202. In some embodiments, the fuel management system 202 may equally be referred to as an aircraft fuel system. Broadly speaking the fuel management system 202 may rely on systems and control logic to pump, manage and deliver fuel fluid (equally referred to as jet fuel) so as to ensure that the engine assembly 34 receives a proper amount of fuel fluid at any stage of operations of the aircraft. Such stage of operations may comprise operations while the aircraft is stationary on the ground, taxiing and/or in-flight (e.g., during take-off, cruise and/or landing). In some embodiments, the fuel management system 202 may comprise additional functionalities, such as, but without being limitative, management of a center of gravity of the aircraft by dynamically adjusting allocation of fuel fluid in each one of the fuel tanks. The fuel management system 202 may also comprise other functionalities which may become apparent to the person skilled in the art of the present technology.

In the illustrated embodiment, the fuel management system 202 comprises one or more fuel tanks 201. Additional systems and components may also be part of the fuel management system 202 such as one or more fuel gauges, one or more fuel pumps, one or more fuel controllers, fuel pipes and/or fuel valves. Such additional systems and components may become readily apparent to the person skilled in the art of the present technology.

The number of fuel tanks, fuel gauges and fuel pumps may vary depending on the configuration of the aircraft. In some embodiments, each fuel tank is associated with a corresponding fuel pump and a corresponding fuel gauge. In some alternative embodiments, each fuel tank may be associated with a plurality of fuel pumps and/or fuel gauges. In some embodiments, a plurality of fuel tanks may be distributed across the aircraft, such as, but without being limitative, in the wings and/or in the fuselage (e.g., within the belly fairing). In some alternative embodiments, such as in fighter jets, the fuel tanks may be located externally (e.g., drop tanks attached to a wing).

In some embodiments, the fuel tanks may be "built-in" a structure of the aircraft that is sealed to allow fuel storage. As previously mentioned, the fuel tanks may be located at various portions of the aircraft, such as, but without being limitative, in the wings, in the fuselage and/or empennage of the aircraft.

FIG. 2 also illustrates "engine #1" which is later refer to as a "first engine" and/or a "left engine" (also referred to as "L Engine") and "engine #2" which is later refer to as a "second engine" and/or a "right engine" (also referred to as "R Engine"). The first engine is later referred to as the first engine 341 and the second engine is later referred to as the second engine 342. It should be understood that reference to the first engine 341 as the left engine and the second engine 342 as the right engine is simply a convention used to ease the description of the present technology. It should be understood that this aspect is not limitative. Even though reference is made to the first engine 341 and the second engine 342, the number of engines is not limitative. In other words, the present technology may also be directed to aircraft having more than two engines (e.g., two side engines and one central engine, four side engines, etc).

In some embodiments, the first engine 341 and the second engine 342 both comprise fuel flowmeters. The fuel flowmeters may allow indicating how much fuel the engines are burning. In some embodiments, fuel flowmeters may have different accuracies at different consumption rates. They may be designed so as to be more accurate when the aircraft is in cruise condition. In some embodiments, a first flowmeter associated with the first engine 341 and a second flowmeter associated with the second engine 342 are installed in the fuel line so as to physically measure a volume of fuel travelling through the lines. In some embodiments, a fuel densitometer may be installed in the one or more fuel tanks 201 so that fuel density may be determined. By multiplying the volume of fuel travelling through the lines with the fuel density, a fuel mass flow rate may be determined. To ease description of the present technology, "fuel flow" and "fuel mass flow" will be used interchangeably.

In some embodiments, the present technology is implemented by the fuel monitoring system 200. In some embodiments, the fuel monitoring system 200 may be a dedicated aircraft system and/or implemented on a system also implementing other functionalities. As an example, but without being limitative, the fuel monitoring system 200 may be part of the aircraft health monitoring system (AHMS). In some embodiments, the fuel monitoring system may 200 may be part of an engine indication and crew alerting system (EICAS). In some embodiments, the fuel monitoring system 200 comprises a fuel leak determination system 204. In some embodiments, the fuel leak determination system 204 may be a sub-system of the fuel monitoring system 200. In some other embodiments, the fuel leak determination system 204 may be the fuel monitoring system 200.

In the embodiment illustrated at FIG. 2, the first engine 341 and the second engine 342 each transmits data to the fuel leak determination system 204. In some embodiments, the data relates to the fuel flow associated with each one of the first engine 341 and the second engine 342. In some embodiments, the data is generated by the flowmeters and is a measurement of the fuel flow of each one of the first engine 341 and the second engine 342.

Figure 3:
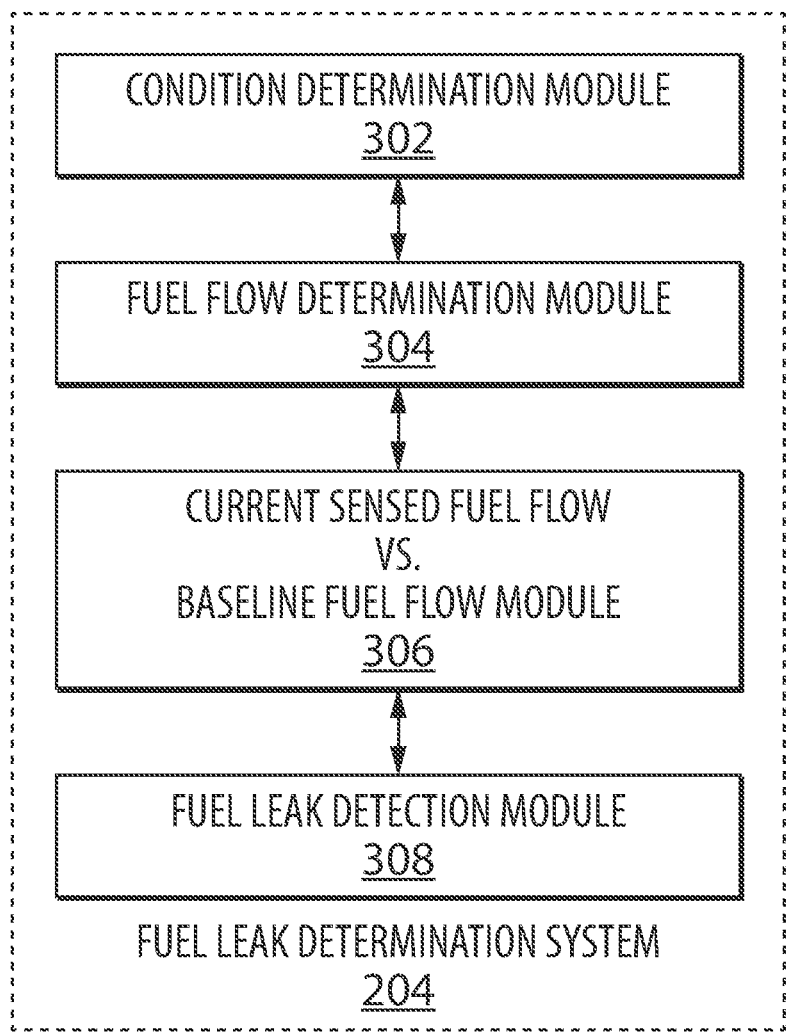
FIGS. 3-8 are diagrams illustrating certain modules of the fuel monitoring system of FIG. 2.

Turning now to FIG. 3, a diagram illustrating certain modules of the fuel leak determination system in accordance with embodiments of the present technology is depicted. As previously mentioned, even though reference is made to modules, it is implied that each one of the modules represent performance of process steps which may be executed by hardware that is expressly or implicitly shown.

The fuel leak determination system 204 illustrated at FIG. 3 comprises a condition determination module 302, a fuel flow determination module 304, a current sensed fuel flow versus baseline fuel flow module 306 and a fuel leak detection module 308. It should be understood that modules 302 to 308 could be sub-divided and/or combined without departing from the scope of the present technology.

Figure 4:
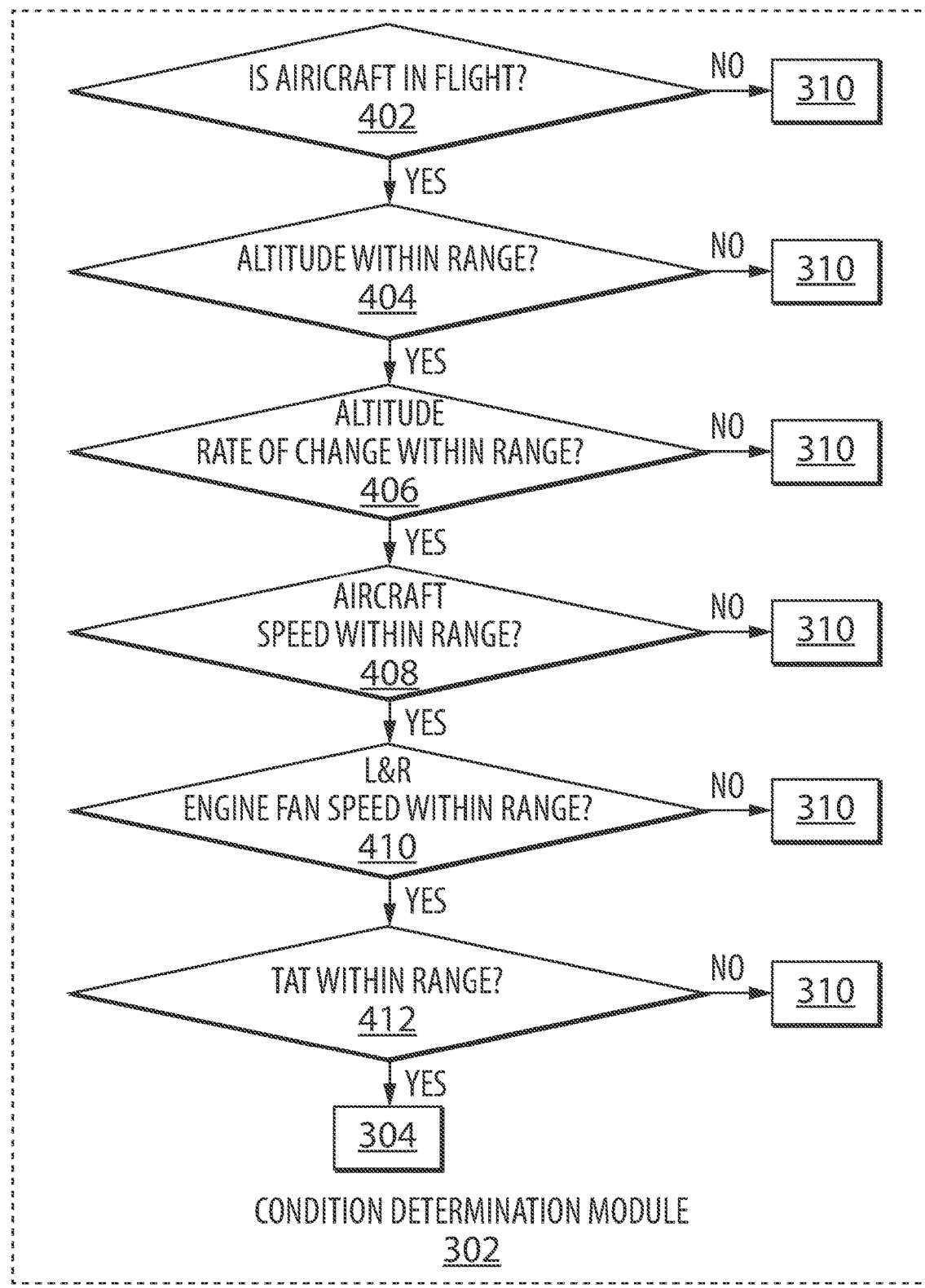

Reference being now made to FIG. 4, an embodiment of the condition determination module 302 is illustrated. In some embodiments, the condition determination module 302 allows determining that the aircraft has reached a stable condition (e.g., cruise) and that the fuel leak detection may be activated. In some embodiments, the stable condition may be referred to as a first mode of operation. In some embodiments, reaching the stable condition triggers acquiring a first baseline fuel flow of the first engine and a second baseline fuel flow of the second engine. In some embodiments, such approach allows increasing an accuracy of the first and second baseline fuel flows as the first and second baseline fuel flows are acquired when the engines are operating at a more stable mode. In the embodiment illustrated at FIG. 4, the condition determination module 302 establishes that the stable mode of operation has been reached by executing steps which determine whether certain conditions have been met. As an exemplary embodiment, such steps include steps 402 to 412. At step 402, a first condition is checked by determining whether the aircraft is in flight. At step 404, a second condition is checked by determining whether an altitude is within a predetermined range. In some embodiments, the predetermined range is between 20,000 feet and 51,000 feet. At step 406, a third condition is checked by determining whether a rate of change of the altitude is within a predetermined range. In some embodiments, the predetermined range is between −400 feet/min and +400 feet/min. At step 408, a fourth condition is checked by determining whether an air speed of the aircraft is within a predetermined range. In some embodiments, the predetermined range is between Mach 0.6 and Mach 0.94. At step 410, a fifth condition is checked by determining whether fan speeds of the first engine and of the second engine is within a predetermined range. In some embodiments, the predetermined range is between 60% and 120% fan speed. At step 412, a sixth condition is checked by determining whether a total air temperature (TAT) sensed by the aircraft is within a predetermined range. In some embodiments, the predetermined range is between −60 Celsius degrees and +40 Celsius degrees.

In some embodiments, if all six conditions of the condition determination module 302 are met, then the fuel flow determination module 304 is engaged. In some embodiments, if one or more of the six conditions are not met, a module 310 may be engaged. Further details regarding the module 310 are provided in connection with the description of FIG. 8.

Figure 5:
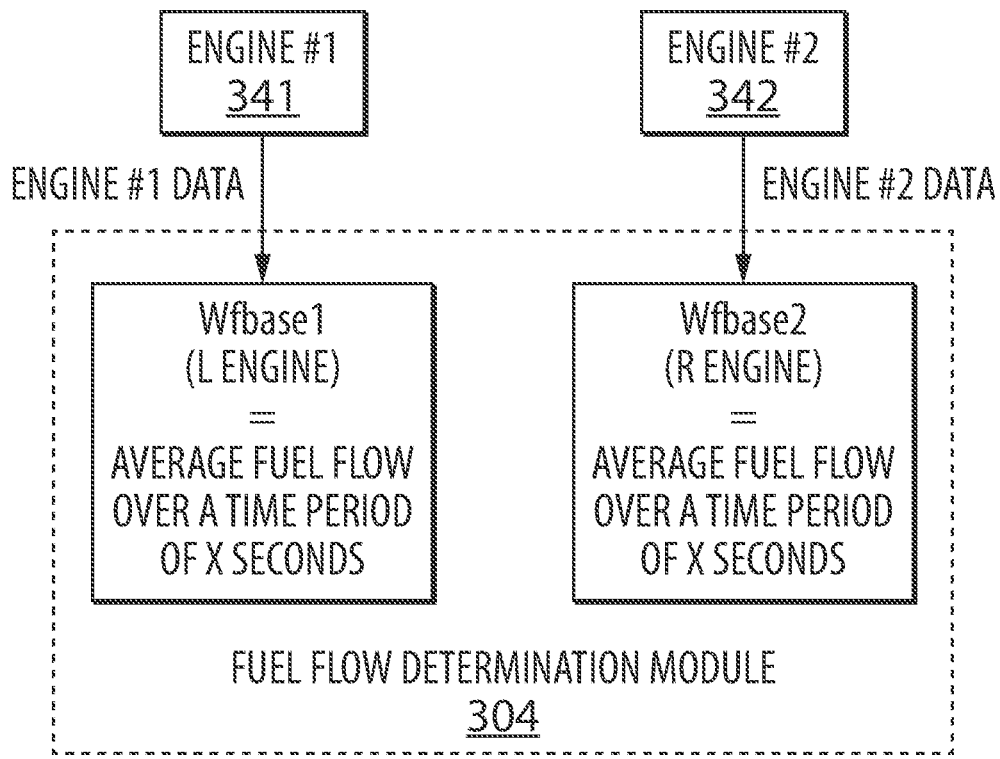

Reference being now made to FIG. 5, an embodiment of the fuel flow determination module 304 is illustrated. In some embodiments, the fuel flow determination module 304 allows acquiring the first and second baseline fuel flow of the first and second engines. In some embodiments, the fuel flow determination module 304 is only engaged if determination that the aircraft has reached a stable condition (e.g., cruise) has been met. In some embodiments, the fuel flow determination module 304 allows setting an average actual fuel flow from each engine recorded over a predetermined time span (e.g., 60 seconds). In the illustrated embodiments, data is received from the first and second engines. In some embodiments, the data relates to the fuel flow associated with each one of the first engine 341 and the second engine 342. In some embodiments, the first baseline fuel flow (Wfbase1) is determined for the first engine and the second baseline fuel flow (Wfbase2) is determined for the second engine. This approach allows establishing baseline fuel flows based on actual, in-service data, when the engines are operating in real-life conditions and in accordance with a given mode of operation. In some embodiments, the first and the second baseline fuel flows are stored temporally or permanently in a non-transitory computer-readable medium so that, once they have been calculated, they can be maintained accessible for later access.

Figure 6:
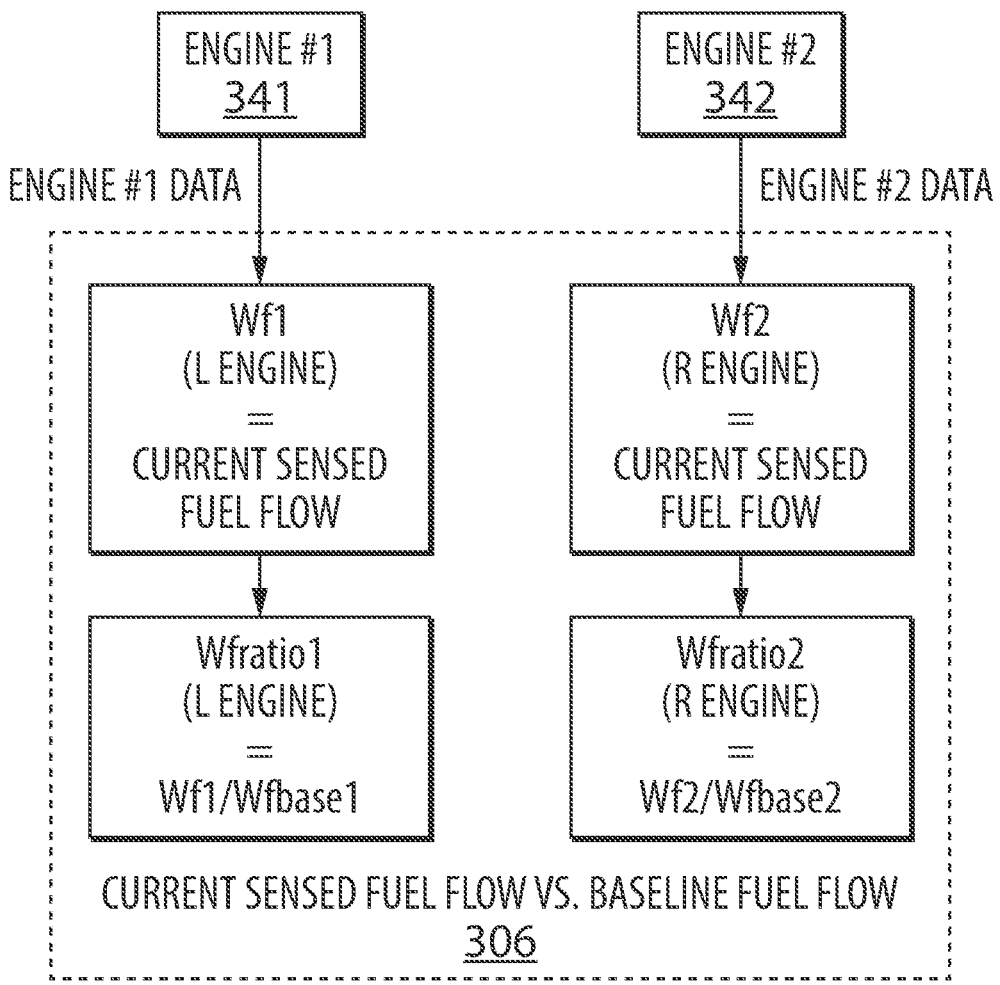

Reference being now made to FIG. 6, an embodiment of the module 306 is illustrated. In some embodiments, the module 306 allows comparing current sensed fuel flows with the first and second baseline fuel flows determined by fuel flow determination module 304. In some embodiments, a first current sensed fuel flow of the first engine (Wf1) is monitored based on the data received from the first engine. A second current sensed fuel flow of the second engine (Wf2) is monitored based on the data received from the second engine. In some embodiments, it is considered that two or more engines operating on a given aircraft at stable conditions should operate at comparable fuel flows for an entire mission, within a reasonable tolerance band.

In some embodiments, once the first mode of operation has been reached, the module 306 calculates a first ratio (Wfratio1) associated with the first engine and a second ration (Wfratio2) associated with the second engine. The first ratio (Wfratio1) may be calculated as being (Wf1/Wfbase1) and the second ration (Wfratio2) may be calculated as being (Wf2/Wfbase2).

Figure 7:
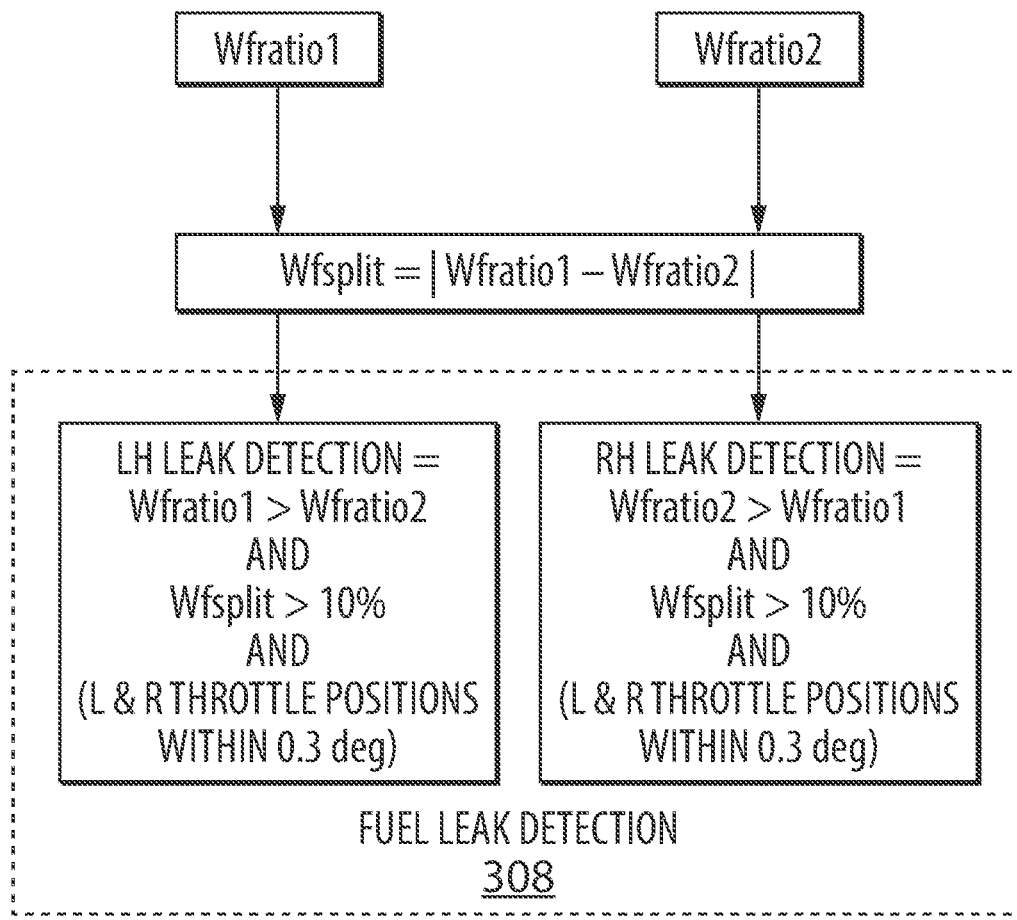

Reference being now made to FIG. 7, an embodiment of the module 308 is illustrated. In some embodiments, the module 308 allows triggering detection of a fuel leak. In some embodiments, the module 308 may not only detect a fuel leak but also detect in which one of the engines the fuel leak occurs. In some embodiments, the module 308 calculate an absolute difference (Wfsplit) between the first ratio (Wfratio1) and the second ratio (Wfratio2). In other words, Wfsplit may be equal to |Wfratio1−Wfratio2|.

In some embodiments, the module 308 detects that a leak occurs at the first engine if the following conditions are met:

Wfratio1>Wfratio2 AND Wfsplit>10% AND (L & R throttle positions are within 0.3 degree).

In some embodiments, the module 308 detects that a leak occurs at the second engine if the following conditions are met:

Wfratio2>Wfratio1 AND Wfsplit>10% AND (L & R throttle positions are within 0.3 degree).

In some embodiments, the threshold associated with Wfsplit may vary (e.g., 9%, 11%, etc). In some embodiments, the L & R throttle positions correspond to a position difference between a first position of a first throttle controlling the first engine and a second position of a second throttle controlling the second engine. In some embodiments, the threshold associated with the L & R throttle positions may vary (e.g., 0.2 degree, 0.4 degree, etc).

In some embodiments, once a leak is detected by the module 308, the fuel monitoring system 200 may inform the pilot and/or co-pilot and/or avionics of the aircraft that a leak has been detected. In some embodiments, a persistency condition is verified before the fuel monitoring system 200 triggers informing the pilot and/or co-pilot and/or avionics of the aircraft that the leak has been detected. The information may further comprise an indication relative to which one of the engines is subjected to a leak. In addition, values associated with the leak may also be provided (e.g., values determined on the basis of the first ratio and the second ratio). This may therefore allow the pilot and/or co-pilot to take corrective measures early on, at a time when mitigation actions may be put in place (e.g., deporting the aircraft to a nearby airport, transferring fuel between fuel tanks, shutting down the engine associated with the leak, etc.).

Figure 8:
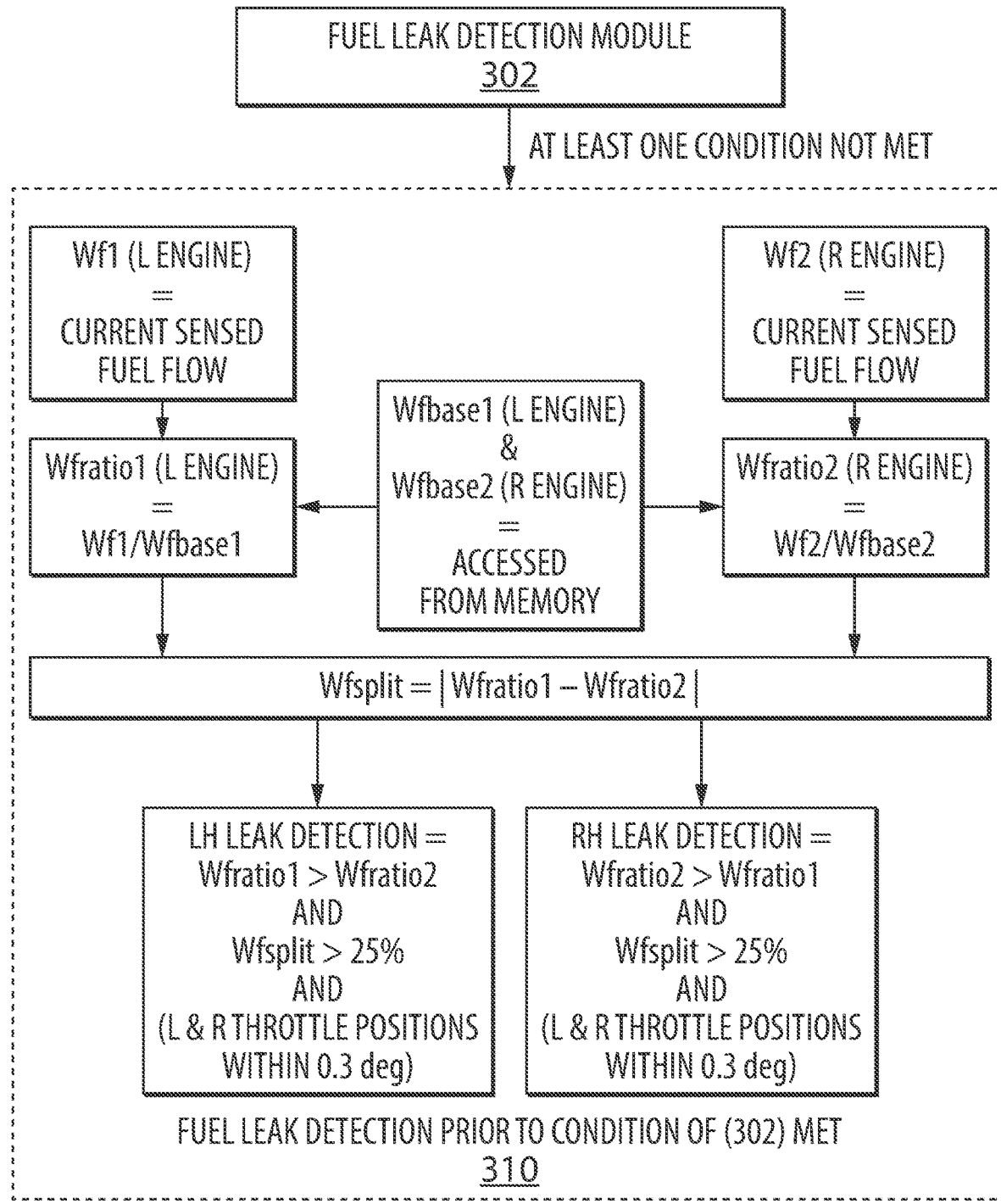

Reference being now made to FIG. 8, an embodiment of the module 310 is illustrated. In some embodiments, the module 310 is engaged when the condition determination module 302 determined that one or more of the conditions establishing that the aircraft is in the first mode of operation is not met. This may be the case when the aircraft has not yet reached a stable condition (e.g., aircraft is taking off, aircraft is still climbing, aircraft is engaged in a manoeuvre, aircraft is landing, aircraft is taxiing, etc). The module 310 therefore allows detection of a leak even though the aircraft has not reach or is no longer operating according to the first mode of operation. In some embodiments, the module 310 relies on air speed and/or wheel speed. In some embodiments, the module 310 relies on previously calculated baseline fuel flows. The previously calculated baseline fuel flows may have been calculated previously during the flight or during a previous flight. In some embodiments, the previously calculated baseline fuel flows comprise a first pre-existing baseline fuel flow and a second pre-existing baseline fuel flow accessed from a non-transitory computer-readable medium of the fuel monitoring system 200. In some embodiments, the module 310 may not only detect a fuel leak but also detect in which one of the engines the fuel leak occurs. In some embodiments, the module 310 calculates an absolute difference (Wfsplit) between the first ratio (Wfratio1) based on the first pre-existing baseline fuel flow and the second ratio (Wfratio2) based on the second pre-existing baseline fuel flow. In other words, Wfsplit may be equal to |Wfratio1−Wfratio2|.

In some embodiments, the module 310 detects that a leak occurs at the first engine if the following conditions are met:

Wfratio1>Wfratio2 AND Wfsplit>25% AND (L & R throttle positions are within 0.3 degree).

In some embodiments, the module 310 detects that a leak occurs at the second engine if the following conditions are met:

Wfratio2>Wfratio1 AND Wfsplit>25% AND (L & R throttle positions are within 0.3 degree).

In some embodiments, the threshold associated with Wfsplit may vary (e.g., 24%, 26%, etc). In some embodiments, the L & R throttle positions correspond to a position difference between a first position of a first throttle controlling the first engine and a second position of a second throttle controlling the second engine. In some embodiments, the threshold associated with the L & R throttle positions may vary (e.g., 0.2 degree, 0.4 degree, etc).

In some embodiments, once the conditions monitored by the condition determination module 302 are met, then the module 310 may be disengaged. At such a stage, the module 308 takes over.

Amongst multiple benefits, the fuel monitoring system 200 described in the paragraphs above may allow (1) better refinement in fuel leak detection; (2) identification of faulty engine; and/or (3) leak detection even though the leak occurs downstream of a flowmeter of an engine.

Figure 9:
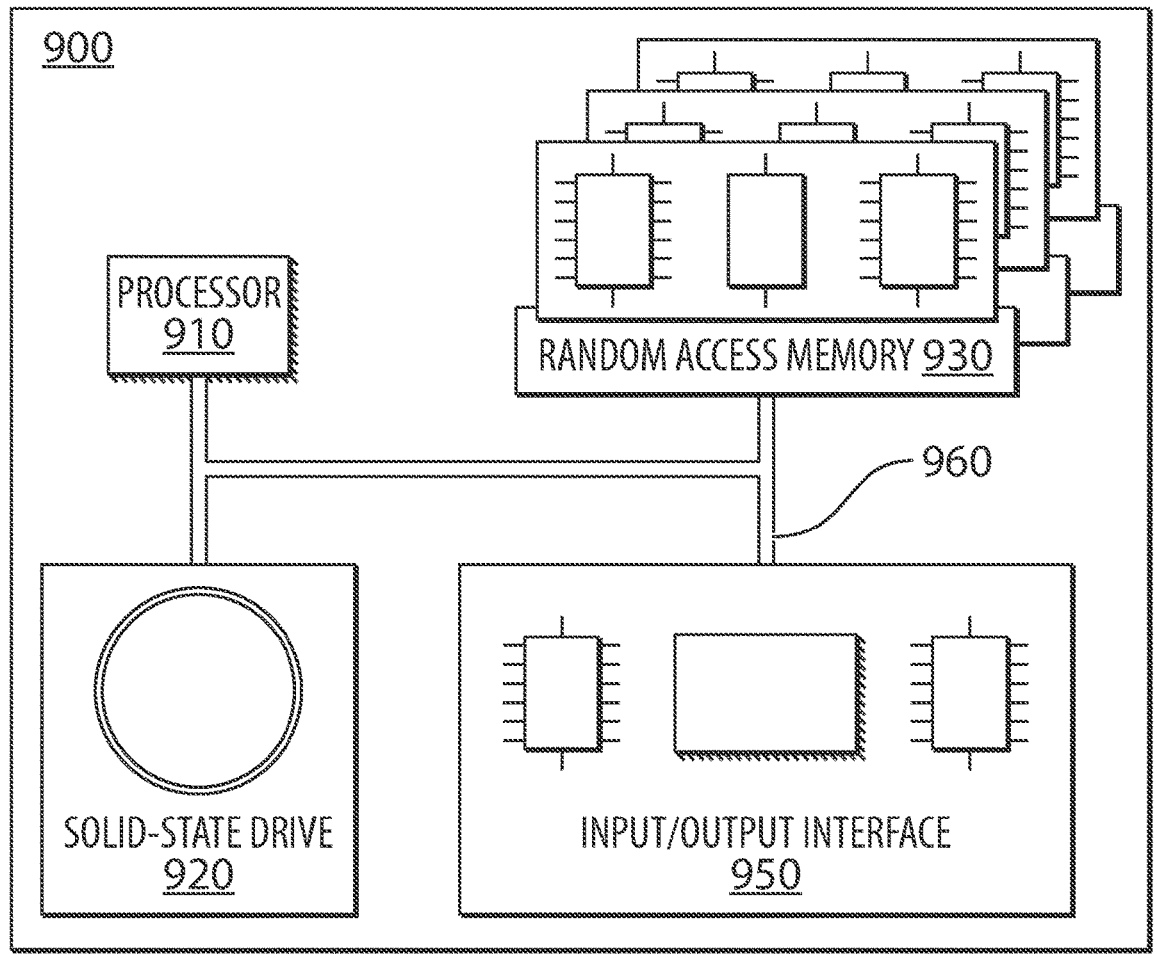
FIG. 9 is a diagram of a computing environment in accordance with an embodiment of the present technology.

Turning now to FIG. 9, a diagram of a computing environment 900 in accordance with an embodiment of the present technology is shown. In some embodiments, the computing environment 900 may be implemented by the fuel monitoring system 200. In some embodiments, the computing environment 900 comprises various hardware components including one or more single or multi-core processors collectively represented by a processor 910, a solid-state drive 920, a random access memory 930 and an input/output interface 950. The computing environment 900 may be a computer specifically designed for installation into an aircraft. In some alternative embodiments, the computing environment 900 may be a generic computer system adapted to meet certain requirements, such as, but not limited to, certification requirements. The computing environment 300 may be an "electronic device", a "controller", a "fuel controller", a "control computer", a "control system", a "computer-based system", a "fuel management system", a "fuel leak determination system", a "fuel monitoring system" and/or any combination thereof appropriate to the relevant task at hand. In some embodiments, the computing environment 900 may also be a sub-system of one of the above-listed systems. In some other embodiments, the computing environment 900 may be an "off the shelf" generic computer system. In some embodiments, the computing environment 900 may also be distributed amongst multiple systems. The computing environment 900 may also be specifically dedicated to the implementation of the present technology. As a person in the art of the present technology may appreciate, multiple variations as to how the computing environment 900 is implemented may be envisioned without departing from the scope of the present technology.

Communication between the various components of the computing environment 900 may be enabled by one or more internal and/or external buses 960 (e.g. a PCI bus, universal serial bus, IEEE 1394 "Firewire" bus, SCSI bus, Serial-ATA bus, ARINC bus, etc.), to which the various hardware components are electronically coupled.

The input/output interface 950 may be coupled directly and/or indirectly to one or more fuel gauges and/or one or more flowmeters and/or other control systems of the aircraft (e.g., the avionics of the aircraft).

According to implementations of the present technology, the solid-state drive 920 stores program instructions suitable for being loaded into the random access memory 930 and executed by the processor 910 for operating a fuel pump management system. For example, the program instructions may be part of a library or an application.

In some embodiments, the computing environment 900 may be configured so as to determine that an aircraft has reached a first mode of operation and/or detect a fuel leak in the aircraft.

Turning now to FIG. 10, a flowchart illustrating a computer-implemented method 1000 of detecting a fuel leak in an aircraft is illustrated. In some embodiments, the computer-implemented method 1000 may be (completely or partially) implemented on the fuel monitoring system 200.

The method 1000 may start at step 1002 by determining that the aircraft has reached a first mode of operation. If such determination is made, then the method 1000 proceeds to step 1004. In some embodiments, determining that the aircraft has reached the first mode of operation comprises determining that the following conditions are met (a) the aircraft is in flight; (b) an altitude of the aircraft is between 20,000 feet and 51,000 feet; (c) a rate of change of the altitude is between −400 feet/min and +400 feet/min; (d) an air speed of the aircraft is between Mach 0.6 and Mach 0.94; (e) fan speeds of the first engine and of the second engine is between 60% and 120% fan speed; and (f) a total air temperature (TAT) sensed by the aircraft is between −60. Celsius degrees and +40 Celsius degrees.

At a step 1004, the method 1000 proceeds to acquiring a first baseline fuel flow of the first engine, the first baseline fuel flow being determined as an average actual fuel flow of the first engine established over a period of time while operating in accordance with the first mode of operation. At a step 1006, the method 1000 proceeds to acquiring a second baseline fuel flow of the second engine, the second baseline fuel flow being determined as an average actual fuel flow of the second engine established over the period of time while operating in accordance with the first mode of operation. In some embodiments, the period of time is 60 seconds.

At a step 1008, the method 1000 proceeds to monitoring a first current fuel flow measured at the first engine and a second current fuel flow measured at the second engine.

At a step 1010, the method 1000 proceeds to triggering a fuel leak detection based on an analysis of the first baseline fuel flow, the first current fuel flow, the second baseline fuel flow and the second current fuel flow.

In some embodiments, the analysis of the first baseline fuel flow, the first current fuel flow, the second baseline fuel flow and the second current fuel flow comprises calculating a first ratio based on the first current fuel flow and the first baseline fuel flow; and calculating a second ratio based on the second current fuel flow and the second baseline fuel flow.

In some embodiments, triggering the fuel leak detection comprises at least one of triggering a first fuel leak detection associated with the first engine and triggering a second fuel leak detection associated with the second engine.

In some embodiments, the first fuel leak detection is triggered based on a determination that the following conditions are met (a) the first ratio is above the second ratio; (b) an absolute value of a difference between the first ratio and the second ratio is above a first predetermined threshold; and (c) a position difference between a first position of a first throttle controlling the first engine and a second position of a second throttle controlling the second engine is below a second predetermined threshold.

In some embodiments, the second fuel leak detection is triggered based on a determination that the following conditions are met (a) the second ratio is above the first ratio; (b) an absolute value of a difference between the first ratio and the second ratio is above a first predetermined threshold; and (c) a position difference between a first position of a first throttle controlling the first engine and a second position of a second throttle controlling the second engine is below a second predetermined threshold.

In some embodiments, the first predetermined threshold is 10% and the second predetermined threshold is 0.3 degree.

In some embodiments, the method further comprises, prior to determining that the first mode of operation has been reached and up until determination that the first mode of operation has been reached accessing, from a non-transitory computer-readable medium, a first pre-existing baseline fuel flow and a second pre-existing baseline fuel flow, the first pre-existing baseline fuel flow and the second pre-existing baseline fuel flow having been acquired during a previous flight of the aircraft; and triggering the fuel leak detection based on an analysis of the first pre-existing baseline fuel flow, the first current fuel flow, the second pre-existing baseline fuel flow and the second current fuel flow.

In some embodiments, the method further comprises, prior to determining that the first mode of operation has been reached and up until determination that the first mode of operation has been reached accessing, from a non-transitory computer-readable medium, a first pre-existing baseline fuel flow and a second pre-existing baseline fuel flow, the first pre-existing baseline fuel flow and the second pre-existing baseline fuel flow having been acquired during a previous flight of the aircraft; and triggering the fuel leak detection based on an analysis of the first pre-existing baseline fuel flow, the first current fuel flow, the second pre-existing baseline fuel flow and the second current fuel flow.

In some embodiments, triggering the fuel leak detection comprises at least one of triggering a first fuel leak detection associated with the first engine and triggering a second fuel leak detection associated with the second engine and wherein the analysis of the first pre-existing baseline fuel flow, the first current fuel flow, the second pre-existing baseline fuel flow and the second current fuel flow comprises calculating a third ratio based on the first current fuel flow and the first pre-existing baseline fuel flow; and calculating a fourth ratio based on the second current fuel flow and the second pre-existing baseline fuel flow.

In some embodiments, the first fuel leak detection is triggered based on a determination that the following conditions are met (a) the third ratio is above the fourth ratio; (b) an absolute value of a difference between the third ratio and the fourth ratio is above a first predetermined threshold; and (c) a position difference between a first position of a first throttle controlling the first engine and a second position of a second throttle controlling the second engine is below a second predetermined threshold.

In some embodiments, the second fuel leak detection is triggered based on a determination that the following conditions are met (a) the fourth ratio is above the third ratio; (b) an absolute value of a difference between the third ratio and the fourth ratio is above a first predetermined threshold; and (c) a position difference between a first position of a first throttle controlling the first engine and a second position of a second throttle controlling the second engine is below a second predetermined threshold.

In some embodiments, the first predetermined threshold is 25% and the second predetermined threshold is 0.3 degrees.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A computer-implemented method of detecting a fuel leak in an aircraft, the aircraft comprising a first engine and a second engine, the method comprising:
   determining that the aircraft has reached a first mode of operation;

upon determining that the aircraft has reached the first mode of operation:
  acquiring a first baseline fuel flow of the first engine using a first flowmeter, the first baseline fuel flow being determined as an average actual fuel flow of the first engine established over a period of time while operating in accordance with the first mode of operation, and
  acquiring a second baseline fuel flow of the second engine using a second flowmeter, the second baseline fuel flow being determined as an average actual fuel flow of the second engine established over the period of time while operating in accordance with the first mode of operation;
monitoring a first current fuel flow measured at the first engine and a second current fuel flow measured at the second engine; and
triggering a fuel leak detection based on an analysis of the first baseline fuel flow, the first current fuel flow, the second baseline fuel flow and the second current fuel flow, wherein determining that the aircraft has reached the first mode of operation comprises determining that the following conditions are met:
  (a) the aircraft is in flight;
  (b) an altitude of the aircraft is between 20,000 feet and 51,000 feet;
  (c) a rate of change of the altitude is between −400 feet/min and +400 feet/min;
  (d) an air speed of the aircraft is between Mach 0.6 and Mach 0.94;
  (e) fan speeds of the first engine and of the second engine are between 60% and 120% fan speed; and
  (f) a total air temperature (TAT) sensed by the aircraft is between −60 Celsius degrees and +40 Celsius degrees, and
wherein the method further comprises, prior to determining that the first mode of operation has been reached and up until determination that the first mode of operation has been reached:
  accessing, from a non-transitory computer-readable medium, a first pre-existing baseline fuel flow and a second pre-existing baseline fuel flow, the first pre-existing baseline fuel flow and the second pre-existing baseline fuel flow having been acquired during a previous flight of the aircraft; and
  triggering the fuel leak detection based on an analysis of the first pre-existing baseline fuel flow, the first current fuel flow, the second pre-existing baseline fuel flow and the second current fuel flow.

2. The method of claim 1, wherein the analysis of the first baseline fuel flow, the first current fuel flow, the second baseline fuel flow and the second current fuel flow comprises:
  calculating a first ratio based on the first current fuel flow and the first baseline fuel flow; and
  calculating a second ratio based on the second current fuel flow and the second baseline fuel flow.

3. The method of claim 2, wherein triggering the fuel leak detection comprises at least one of triggering a first fuel leak detection associated with the first engine and triggering a second fuel leak detection associated with the second engine.

4. A system for detecting a fuel leak in an aircraft, the aircraft comprising a first engine and a second engine, the system comprising:
  a processor;
  a non-transitory computer-readable medium, the non-transitory computer-readable medium comprising control logic which, upon execution by the processor, causes:
  upon determining that the aircraft has reached a first mode of operation:
    acquiring a first baseline fuel flow of the first engine using a first flowmeter, the first baseline fuel flow being determined as an average actual fuel flow of the first engine established over a period of time while operating in accordance with the first mode of operation, and
    acquiring a second baseline fuel flow of the second engine using a second flowmeter, the second baseline fuel flow being determined as an average actual fuel flow of the second engine established over the period of time while operating in accordance with the first mode of operation;
  monitoring a first current fuel flow measured at the first engine and a second current fuel flow measured at the second engine; and
  triggering a fuel leak detection based on an analysis of the first baseline fuel flow, the first current fuel flow, the second baseline fuel flow and the second current fuel flow, wherein determining that the aircraft has reached the first mode of operation comprises determining that the following conditions are met:
    (a) the aircraft is in flight;
    (b) an altitude of the aircraft is between 20,000 feet and 51,000 feet;
    (c) a rate of change of the altitude is between −400 feet/min and +400 feet/min;
    (d) an air speed of the aircraft is between Mach 0.6 and Mach 0.94;
    (e) fan speeds of the first engine and of the second engine is between 60% and 120% fan speed; and
    (f) a total air temperature (TAT) sensed by the aircraft is between −60 Celsius degrees and +40 Celsius degrees, and
  wherein the non-transitory computer-readable medium further causes, prior to determining that the first mode of operation has been reached and up until determination that the first mode of operation has been reached:
    accessing, from a non-transitory computer-readable medium, a first pre-existing baseline fuel flow and a second pre-existing baseline fuel flow, the first pre-existing baseline fuel flow and the second pre-existing baseline fuel flow having been acquired during a previous flight of the aircraft; and
    triggering the fuel leak detection based on an analysis of the first pre-existing baseline fuel flow, the first current fuel flow, the second pre-existing baseline fuel flow and the second current fuel flow.

5. The system of claim 4, wherein the analysis of the first baseline fuel flow, the first current fuel flow, the second baseline fuel flow and the second current fuel flow comprises:
  calculating a first ratio based on the first current fuel flow and the first baseline fuel flow; and
  calculating a second ratio based on the second current fuel flow and the second baseline fuel flow.

6. The system of claim 5, wherein triggering the fuel leak detection comprises at least one of triggering a first fuel leak detection associated with the first engine and triggering a second fuel leak detection associated with the second engine.

7. The system of claim 6, the first fuel leak detection is triggered based on a determination that the following conditions are met:
(a) the first ratio is above the second ratio;
(b) an absolute value of a difference between the first ratio and the second ratio is above a first predetermined threshold; and
(c) a position difference between a first position of a first throttle controlling the first engine and a second position of a second throttle controlling the second engine is below a second predetermined threshold.

8. The system of claim 7, the second fuel leak detection is triggered based on a determination that the following conditions are met:
(a) the second ratio is above the first ratio;
(b) an absolute value of a difference between the first ratio and the second ratio is above a first predetermined threshold; and
(c) a position difference between a first position of a first throttle controlling the first engine and a second position of a second throttle controlling the second engine is below a second predetermined threshold.

9. The system of claim 8, wherein the first predetermined threshold is 10% and the second predetermined threshold is 0.3 degree.

10. The system of claim 4, wherein the period of time is 60 seconds.

11. The system of claim 4, wherein triggering the fuel leak detection comprises at least one of triggering a first fuel leak detection associated with the first engine and triggering a second fuel leak detection associated with the second engine and wherein the analysis of the first pre-existing baseline fuel flow, the first current fuel flow, the second pre-existing baseline fuel flow and the second current fuel flow comprises:
calculating a third ratio based on the first current fuel flow and the first pre-existing baseline fuel flow; and
calculating a fourth ratio based on the second current fuel flow and the second pre-existing baseline fuel flow.

12. The system of claim 11, wherein the first fuel leak detection is triggered based on a determination that the following conditions are met:
(a) the third ratio is above the fourth ratio;
(b) an absolute value of a difference between the third ratio and the fourth ratio is above a first predetermined threshold; and
(c) a position difference between a first position of a first throttle controlling the first engine and a second position of a second throttle controlling the second engine is below a second predetermined threshold.

13. The system of claim 12, wherein the second fuel leak detection is triggered based on a determination that the following conditions are met:
(a) the fourth ratio is above the third ratio;
(b) an absolute value of a difference between the third ratio and the fourth ratio is above a first predetermined threshold; and
(c) a position difference between a first position of a first throttle controlling the first engine and a second position of a second throttle controlling the second engine is below a second predetermined threshold.

14. The system of claim 13, wherein the first predetermined threshold is 25% and the second predetermined threshold is 0.3 degree.

15. A non-transitory computer-readable medium storing instructions that when executed by at least one processor, cause the at least one processor to:

determine that an aircraft comprising a first engine and a second engine has reached a first mode of operation;
upon determining that the aircraft has reached the first mode of operation:
acquire a first baseline fuel flow of the first engine using a first flowmeter, the first baseline fuel flow being determined as an average actual fuel flow of the first engine established over a period of time while operating in accordance with the first mode of operation, and
acquire a second baseline fuel flow of the second engine using a second flowmeter, the second baseline fuel flow being determined as an average actual fuel flow of the second engine established over the period of time while operating in accordance with the first mode of operation;
monitor a first current fuel flow measured at the first engine and a second current fuel flow measured at the second engine; and
trigger a fuel leak detection based on an analysis of the first baseline fuel flow, the first current fuel flow, the second baseline fuel flow and the second current fuel flow, wherein determining that the aircraft has reached the first mode of operation comprises determining that the following conditions are met:
(a) the aircraft is in flight;
(b) an altitude of the aircraft is between 20,000 feet and 51,000 feet;
(c) a rate of change of the altitude is between −400 feet/min and +400 feet/min;
(d) an air speed of the aircraft is between Mach 0.6 and Mach 0.94;
(e) fan speeds of the first engine and of the second engine is between 60% and 120% fan speed; and
(f) a total air temperature (TAT) sensed by the aircraft is between −60 Celsius degrees and +40 Celsius degrees, and
wherein the non-transitory computer-readable medium further causes, prior to determining that the first mode of operation has been reached and up until determination that the first mode of operation has been reached:
accessing, from a non-transitory computer-readable medium, a first pre-existing baseline fuel flow and a second pre-existing baseline fuel flow, the first pre-existing baseline fuel flow and the second pre-existing baseline fuel flow having been acquired during a previous flight of the aircraft; and
triggering the fuel leak detection based on an analysis of the first pre-existing baseline fuel flow, the first current fuel flow, the second pre-existing baseline fuel flow and the second current fuel flow.

16. The non-transitory computer-readable medium of claim 15, wherein the instructions cause the at least one processor to:
calculate a first ratio based on the first current fuel flow and the first baseline fuel flow; and
calculate a second ratio based on the second current fuel flow and the second baseline fuel flow.

17. The non-transitory computer-readable medium of claim 16, wherein the instructions cause the at least one processor to perform at least one of triggering a first fuel leak detection associated with the first engine and triggering a second fuel leak detection associated with the second engine.

18. The non-transitory computer-readable medium of claim 17, wherein the instructions that cause the at least one processor to trigger the first fuel leak detection comprise instructions that cause the at least one processor to trigger the first fuel leak detection based on a determination that the following conditions are met:
  (a) the first ratio is above the second ratio;
  (b) an absolute value of a difference between the first ratio and the second ratio is above a first predetermined threshold; and
  (c) a position difference between a first position of a first throttle controlling the first engine and a second position of a second throttle controlling the second engine is below a second predetermined threshold.

* * * * *